(12) United States Patent
Ando

(10) Patent No.: US 8,133,459 B2
(45) Date of Patent: Mar. 13, 2012

(54) METHOD FOR PURIFYING AQUEOUS ALKALINE SOLUTION

(75) Inventor: Keiji Ando, Kanagawa (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 433 days.

(21) Appl. No.: 11/632,707

(22) PCT Filed: Aug. 4, 2005

(86) PCT No.: PCT/JP2005/014337
§ 371 (c)(1),
(2), (4) Date: Jan. 18, 2007

(87) PCT Pub. No.: WO2006/018985
PCT Pub. Date: Feb. 23, 2006

(65) Prior Publication Data
US 2008/0078722 A1  Apr. 3, 2008

(30) Foreign Application Priority Data
Aug. 6, 2004  (JP) .................................. 2004-231330

(51) Int. Cl.
*C01D 3/06* (2006.01)

(52) U.S. Cl. ......... 423/183; 210/670; 210/688; 210/912
(58) Field of Classification Search .................. 210/670, 210/673, 681, 688, 912; 502/418, 426; 423/183
See application file for complete search history.

(56) References Cited

U.S. PATENT DOCUMENTS

| | | | | |
|---|---|---|---|---|
| 6,033,573 A | * | 3/2000 | Toles et al. | 210/688 |
| 6,225,256 B1 | * | 5/2001 | Shawabkeh et al. | 502/424 |
| 6,890,417 B2 | | 5/2005 | Yamashita et al. | |
| 2003/0008504 A1 | | 1/2003 | Miyazaki | |
| 2004/0040906 A1 | * | 3/2004 | Jagtoyen et al. | 210/502.1 |

FOREIGN PATENT DOCUMENTS

| | | | |
|---|---|---|---|
| EP | 0 747 436 | | 12/1996 |
| JP | 52-52898 | | 4/1977 |
| JP | 4-290549 | | 10/1992 |
| JP | 7-41658 | | 2/1995 |
| JP | 7-166053 | | 6/1995 |
| JP | 9-124930 | | 5/1997 |
| JP | 2741795 | | 1/1998 |
| JP | 2000-203828 | | 7/2000 |
| JP | 2000203828 A | * | 7/2000 |
| JP | 2001-250807 | | 9/2001 |
| JP | 2002-317285 | | 10/2002 |
| JP | 2003-521368 | | 7/2003 |
| JP | 2004-43812 | | 2/2004 |

(Continued)

OTHER PUBLICATIONS

English language translation No. PTO 11-4084 of JP 52-052898 to Sakayori et al made by the USPTO.*

(Continued)

*Primary Examiner* — Matthew Savage
(74) *Attorney, Agent, or Firm* — Staas & Halsey LLP

(57) ABSTRACT

A method for purifying an aqueous alkaline solution, which comprises: bringing a fibrous activated carbon into contact with an aqueous alkaline solution to remove a metal component other than alkali metals and alkaline earth metals from the aqueous alkaline solution.

8 Claims, 3 Drawing Sheets

FOREIGN PATENT DOCUMENTS

| | | |
|---|---|---|
| JP | 2004-107488 | 4/2004 |
| JP | 2004-256827 | 9/2004 |
| JP | 2004-344715 | 12/2004 |
| JP | 2005-1955 | 1/2005 |
| KR | 2001-0112292 | 12/2001 |
| WO | 94/19394 | 9/1994 |
| WO | WO 01/56678 A1 | 8/2001 |

OTHER PUBLICATIONS

International Search Report mailed Nov. 15, 2005 for International Application PCT/JP2005/014337 (Filed Aug. 4, 2005).

International Search Report issued in International Application PCT/JP2005/017787, mailed on Dec. 20, 2005.

S. M. Lee et al., "The effects of picolinic acid and pH on the adsorption of Cu(II) by activated carbon fibers," CARBON, vol. 40, 2002, pp. 329-334.

Jae-Woon Shim et al., "Effect of modification with $HNO_3$ and NaOH on metal adsorption by pitch-based activated carbon fibers," CARBON, vol. 39, 2001, pp. 1635-1642.

Diksha Aggarwal et al., "Adsorption of chromium by activated carbon from aqueous solution," CARBON, vol. 37, 1999, pp. 1989-1997.

Extended European Search Report for related European Patent Application No. 05768860.8, issued on May 9, 2011.

* cited by examiner

US 8,133,459 B2

METHOD FOR PURIFYING AQUEOUS ALKALINE SOLUTION

This application claims the benefit under 35 U.S.C. Section 371, of PCT International Application Number PCT/JP2005/014337, filed Aug. 4, 2005 and Japanese Application No. 2004-231330, filed Aug. 6, 2004 in Japan, the contents of which are incorporated herein by reference.

TECHNICAL FIELD

The present invention relates to a method for purifying an aqueous alkaline solution.

BACKGROUND ART

Aqueous alkaline solutions are easy to handle, and therefore it have been increasingly employed as etching agents for silicon wafers instead of a hard-to-handle mixed acid which contains hydrofluoric acid, nitric acid and acetic acid. The aqueous alkaline solutions, however, contain trace amounts of metals such as iron, nickel, molybdenum and/or copper. Such metals are derived from raw materials for the aqueous alkaline solutions or contaminated during production processes. These impurities containing metals such as iron, nickel, molybdenum and/or copper penetrate a silicon wafer during etching, remain therein after etching and thus cause change in electrical insulating properties of the silicon wafer. Accordingly, such aqueous alkaline solutions containing a certain amount of these metallic impurities are substantially difficult to use as etching agents practically.

In order to use in etching of silicon wafers, the content of each of metallic impurities which are contained in trace amounts in the aqueous alkaline solutions should be reduced to 200 ppb or less, more preferably 100 ppb or less. More specifically, it has been demanded to reduce an iron content to 100 ppb or less, more preferably 10 ppb or less; a molybdenum content to 100 ppb or less, more preferably 10 ppb or less; and a nickel content to 10 ppb or less, more preferably 1 ppb or less.

Certain methods for purifying an aqueous alkaline solution have been known to use activated carbon. However, no method is known which reduces metallic impurities to such concentrations as to be used for the aqueous alkaline solutions etching of silicon wafers. The patent document 1 as described below discloses a method for purifying an aqueous sodium hydroxide solution by using an activated carbon. In the method, iron contained in the aqueous sodium hydroxide solution is removed with the use of activated carbon, thereby to avoid problems in production of sodium hypochlorite. This document, however, merely discloses that iron contained as impurity can be removed to a content of 2 ppm in terms of $Fe_2O_3$ by allowing the aqueous sodium hydroxide solution to pass through a layer of granular activated carbon.

Patent document 2 described below relating to a method for removing nickel discloses that the nickel content can be reduced to the order of about 10 ppb by allowing an aqueous potassium hydroxide solution to pass through a filtrating device precoated with activated carbon derived from coconut shell. This document, however, merely discloses a specific example in which the nickel content is reduced to about 50 ppb. In addition, the used activated carbon is granular activated carbon prepared from coconut shell and is apt to become fine powder. This often invites clogging of the filtrating device and/or scattering of dust and thereby requires excessive facilities such as dustproof devices in practical use. In addition, the activated carbon is difficult to reactivate, which obstructs reuse of the resources.

Furthermore, techniques wherein an activated carbon is used to remove copper have not been known yet.

The patent document 3 described below discloses another method for purifying an aqueous sodium hydroxide solution by removing metallic impurities therefrom, in which the aqueous sodium hydroxide solution is purified by electrolysis with a cation-exchange membrane. This document mentions that this method can reduce the concentration of metallic impurities in the aqueous sodium hydroxide solution to 10 ppb or less. This method, however, is low in efficiency, since metallic impurities are removed while increasing the concentration of the aqueous sodium hydroxide solution by further electrolyzing an aqueous sodium hydroxide solution once prepared by electrolysis of sodium chloride.

Patent document 1: Japanese Patent Application, First Publication No. Sho 52-52898
Patent document 2: Japanese Patent Application, First Publication No. 2000-203828
Patent document 3: Japanese Patent Application, First Publication No. 2002-317285

DISCLOSURE OF INVENTION

Problems to be Solved by the Invention

Under these circumstances, the present invention has been accomplished, and an object of the present invention is to provide a method for industrially producing a high-purity aqueous alkaline solution which is reduced in content of metallic impurities to such levels as to be satisfactorily used as an etching agent for silicon wafers by the use of a fibrous activated carbon. Another object of the present invention is to provide an etching agent for silicon wafers. Yet another object of the present invention is to provide use of a fibrous activated carbon for efficiently removing metallic impurities from an aqueous alkaline solution, and a device for purifying an aqueous alkaline solution using a fibrous activated carbon.

Means for Solving the Problem

After intensive investigations, the present inventor has found that a fibrous activated carbon is capable of highly removing metallic impurities such as nickel, iron, molybdenum and copper contained in trace amounts in an aqueous alkaline solution. He also has found that the fibrous activated carbon can have further increased capability of removing metallic impurities by bringing the fibrous activated carbon into contact with an acid or a mixture of two or more acids selected from hydrochloric acid, nitric acid, sulfuric acid and phosphoric acid. The present invention has been achieved based on these findings.

The present invention provides, in a first aspect, (1) a method for purifying an aqueous alkaline solution as follows.

(1) A method for purifying an aqueous alkaline solution, comprising:
bringing a fibrous activated carbon into contact with an aqueous alkaline solution to remove a metal component other than alkali metals and alkaline earth metals from the aqueous alkaline solution.

The following embodiments (2) to (12) are preferred in the present invention.

(2) The method for purifying an aqueous alkaline solution according to claim 1, wherein the aqueous alkaline solution is an aqueous alkaline solution which comprises at least one hydroxide of at least one metal selected from the group consisting of alkali metals and alkaline earth metals, and further comprises the at least one metal component other than alkali metals and alkaline earth metals.

(3) The method for purifying an aqueous alkaline solution according to (1) or (2), wherein the fibrous activated carbon has an average aspect ratio of 10 or more.

(4) The method for purifying an aqueous alkaline solution according to any one of (1) to (3), wherein the fibrous activated carbon has a specific surface area of 1000 m$^2$/g or more and a pore volume of 0.45 ml/g or more.

(5) The method for purifying an aqueous alkaline solution according to any one of (1) to (4), further comprising: activating a fibrous activated carbon with an acid or a mixture of two or more acids selected from the group consisting of hydrochloric acid, sulfuric acid, nitric acid, and phosphoric acid before bringing the fibrous activated carbon into contact with the aqueous alkaline solution.

(6) The method for purifying an aqueous alkaline solution according to any one of (1) to (5), wherein the at least one metal component other than alkali metals and alkaline earth metals contained in the aqueous alkaline solution contains at least one metal selected from the group consisting of iron, nickel, molybdenum and copper.

(7) The method for purifying an aqueous alkaline solution according to any one of (1) to (6), wherein the aqueous alkaline solution is an aqueous sodium hydroxide solution or an aqueous potassium hydroxide solution.

(8) The method for purifying an aqueous alkaline solution according to any one of (1) to (7), wherein a concentration of metal hydroxide comprised in the aqueous alkaline solution before bringing into contact with the fibrous activated carbon is 10 to 55% by weight.

(9) The method for purifying an aqueous alkaline solution according to any one of (1) to (8), comprising: continuously passing the aqueous alkaline solution through a column containing the fibrous activated carbon thereby to bring the fibrous activated carbon into contact with the aqueous alkaline solution.

(10) The method for purifying an aqueous alkaline solution according to (9), wherein the column containing the fibrous activated carbon includes at least one fibrous activated carbon layer and at least one vacant layer free from the fibrous activated carbon, and wherein the at least one vacant layer is arranged upstream from, downstream from, and/or inside the at least one fibrous activated carbon layer.

(11) The method for purifying an aqueous alkaline solution according to (9) or (10), wherein two or more columns which contain the fibrous activated carbon and are connected to each other are used.

(12) The method for purifying an aqueous alkaline solution according to (1) or (2), further comprising:

washing the fibrous activated carbon, which is a spent fibrous activated carbon used for a purification of the aqueous alkaline solution, with pure water;

bringing the washed fibrous activated carbon into contact with an acid or a mixture of two or more acids selected from the group consisting of hydrochloric acid, nitric acid, sulfuric acid, and phosphoric acid for activation to obtain a recycled fibrous activated carbon; and using the fibrous activated carbon again for purification of an aqueous alkaline solution.

A set of tree processes of (12) can be repeated one or more times.

The present invention also provides the following etching agent according to (13).

(13) An etching agent for silicon wafers, containing an aqueous alkaline solution purified by the method according to any one of (1) to (12).

The present invention further provides, in a second aspect, (14) use of a fibrous activated carbon.

(14) Use of a fibrous activated carbon for bringing the fibrous activated carbon into contact with an aqueous alkaline solution to remove metal components other than alkali metals and alkaline earth metals from the aqueous alkaline solution.

The aqueous alkaline solution may be an aqueous alkaline solution containing a hydroxide of at least one metal selected from the group consisting of alkali metals and alkaline earth metals and further containing at least one metal component other than alkali metals and alkaline earth metals.

The present invention also provides, in a third aspect, (15) a device for purifying an aqueous alkaline solution below.

(15) A device for purifying an aqueous alkaline solution, comprising a vessel containing a fibrous activated carbon, wherein the vessel has an inlet for introducing an aqueous alkaline solution into the vessel, the aqueous alkaline solution containing at least one hydroxide of at least one metal selected from the group consisting of alkali metals and alkaline earth metals and further containing a metal component other than alkali metals and alkaline earth metals, and also has an outlet for discharging the aqueous alkaline solution, from which the metal component other than alkali metals and alkaline earth metals has been removed, out of the vessel.

Effect of the Invention

The present invention efficiently removes a metal component or metal components, such as nickel, iron, molybdenum and copper, other than alkali metals and alkaline earth metals contained in an aqueous alkaline solution and can industrially produce a high-purity aqueous alkaline solution that is suitable as an etching agent for silicon wafers.

BRIEF DESCRIPTION OF THE REFERENCE SYMBOLS

Figure 1:
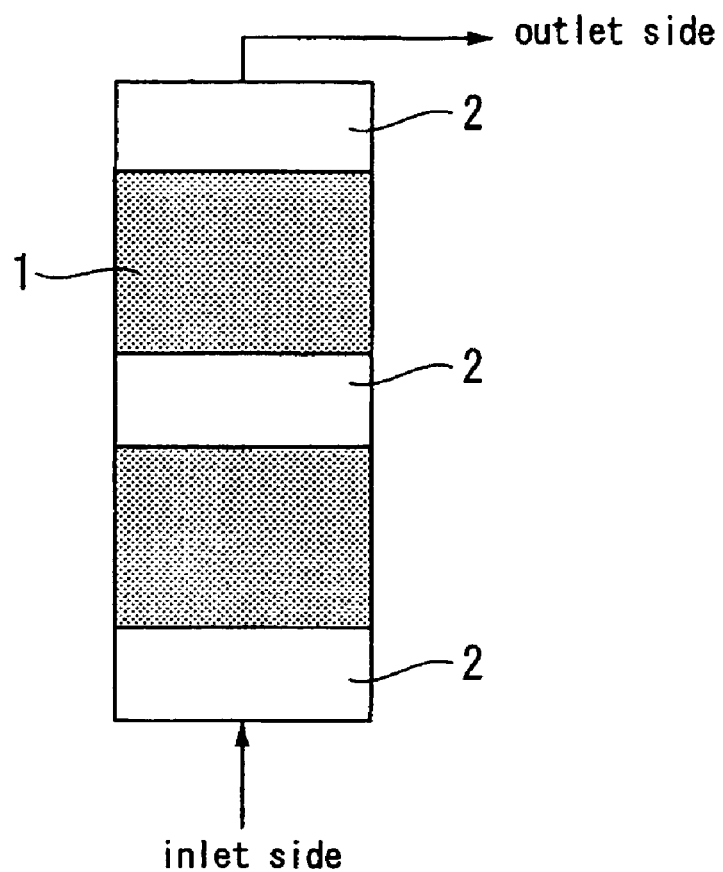
FIG. 1 is a schematic cross-sectional view of a column containing a fibrous activated carbon for use in an embodiment of the purification method of the present invention.

1: activated carbon layer
2: vacant layer
3: mesh filter
4: column
5: jacket.

BEST MODE FOR CARRYING OUT THE INVENTION

The present invention relates to a technique for producing an aqueous alkaline solution suitable for etching of silicon wafers. This is achieved by removing metallic impurities typified by nickel, iron, molybdenum and copper from an aqueous solution such as an aqueous alkaline solution containing one or more metal hydroxides selected from alkali metal hydroxides and alkaline earth metal hydroxides. The present invention also relates to an etching agent for silicon wafers, comprising the aqueous alkaline solution.

Aqueous alkaline solutions to be purified according to the present invention generally contain several parts per million (ppm) to several parts per billion (ppb) of metal components such as iron, nickel, chromium, copper and/or manganese. These metal components are derived from production processes and/or raw materials for alkali metal hydroxides or alkaline earth metal hydroxides. To use the aqueous alkaline solutions as an etching agent for silicon wafers, these metal components other than alkali metals and alkaline earth metals should be removed as much as possible. Particularly, metal components such as iron, nickel molybdenum and copper may attach to and penetrate silicon wafers if contained in the aqueous alkaline solutions and must be removed therefrom.

To use as an etching agent for silicon wafers, the aqueous alkaline solution which can be purified according to the present invention comprising a hydroxide or hydroxides of at least one metal selected from alkali metals and alkaline earth metals is preferably an aqueous sodium hydroxide solution or an aqueous potassium hydroxide solution. Namely, the hydroxide is preferably sodium hydroxide or potassium hydroxide. Furthermore, as long as there is no adverse effect, another aqueous alkaline solutions such as those using an TMAH (tetramethyl ammonium hydroxide) can also be purified by the method of the present invention.

A fibrous activated carbon must be used for removing trace amounts of metallic impurities from these aqueous alkaline solutions.

The fibrous activated carbon for use in the present invention can be freely selected according to necessity, as long as there is no adverse effect. Examples of the fibrous activated carbon are one prepared by spinning a phenol resin derived from carbonaceous materials, a petroleum pitch or the like and subjecting the spun fiber to heat treatment; and one prepared by subjecting an acrylic fiber or rayon fiber to heat treatment.

The fibrous activated carbon for use in the present invention can have any shape, as long as it is not granular. For example, any activated carbon having at least a fibrous portion can be used as the fibrous activated carbon. The fibrous activated carbon can be any of an activated carbon having a fibrous shape, an aggregate of activated carbon fibers, an activated carbon at least partially having a fibrous shape, and an activated carbon at least partially having plural microfibrils. The fibrous activated carbon for use in the present invention is preferably an aggregate of monofilaments of activated carbon. Examples thereof may include an aggregate of monofilaments of activated carbon in the form of a knitted product, a woven product or a bundle of an aggregate of monofilaments of activated carbon. Specific examples thereof include activated carbon in the form of continuous fiber, activated carbon in the form of short fiber (chopped activated carbon), activated carbon in the form of fabric such as a knitted fabric or woven fabric, and activated carbon in the form of nonwoven fabric such as a felt. The diameter of a monofilament or portion of fiber of the fibrous activated carbon can be set according to necessity and is preferably about 5 to 20 μm, more preferably about 5 to 15 μm. An activated carbon having a fiber diameter within the above-specified range is preferred for satisfactory strength and good handleability. If the fiber diameter is less than 5 μm, the filter may be significantly clogged, resulting in decreased operability and decreased purification efficiency.

The length of the fibrous activated carbon for use in the present invention is not specifically limited and can be set according to necessity. When the fibrous activated carbon is, for example, an activated carbon in the form of short fiber, the length of the short fiber is generally about 0.05 to 20 mm, preferably about 0.1 to 20 mm, more preferably about 0.5 to 20 mm, and furthermore preferably about 1 to 20 mm. The length of the fibrous activated carbon is preferably about 0.1 to 20 mm for satisfactory charging into a column and good handleability.

The ratio of the length to the diameter of the fibrous activated carbon (hereinafter referred to as "aspect ratio") is, on average, 10 or more. If the average aspect ratio is less than 10, filling bulk density may become too high. Such a high filling bulk density may invite increased pressure loss. When a long-fiber fibrous activated carbon is used, there is no upper limit in the average aspect ratio, and the upper limit can be freely set according to necessity. When a short-fiber activated carbon is used, the average aspect ratio of 2000 or more is not preferable. A short-fiber activated carbon having an average aspect ratio of 2000 or more may become excessively bulky, be difficult to charge into a column or be charged unevenly in the column.

The distribution and average of aspect ratios of a short-fiber activated carbon can be determined according to the following method.

Initially, a sample fibrous activated carbon is dispersed in water to yield a dilute slurry. The slurry is filtrated through a filter paper, and the filter paper is dried. A micrograph of the fibrous activated carbon dispersed on the filter paper is taken under a magnification of 10 times. Thirty activated carbon fibers are selected at random from the micrograph, and the fiber lengths thereof are measured. Separately, electron micrographs of ten activated carbon fibers selected at random are taken under a magnification of 3000 times, and the fiber diameters thereof are measured. The average of the ten fiber diameters is defined as the fiber diameter of the fibrous activated carbon. The fiber lengths of the thirty activated carbon fibers are divided by the above-defined fiber diameter of the fibrous activated carbon to give each aspect ratio, and the variation (distribution) and average of the aspect ratios are then determined by calculation.

In the case of a short-fiber activated carbon, the average aspect ratio is more preferably 50 to 1800, and further preferably 100 to 1500.

When charged into a vessel having an inlet and an outlet, such as a column, the shape of the fibrous activated carbon can be selected according to necessity. For example, the fibrous activated carbon can be an article in the form of short fiber, a compression molded article in the form of a sheet or nonwoven fabric such as a felt, a finely cut product of these articles, or an article prepared by compressing and molding a long-fiber or short-fiber activated carbon in accordance with the shape of the column.

The fibrous activated carbon for use in the present invention preferably has a BET specific surface area of 1000 $m^2$/g or more, and a BET pore volume of 0.45 ml/g or more, both as determined according to a BET method from nitrogen adsorption. It has more preferably a BET specific surface area of 1500 m²/g or more and a BET pore volume of 0.45 ml/g or more.

If the fibrous activated carbon has a specific surface area less than 1000 m²/g, it may not sufficiently reduce nickel content in the aqueous alkaline solution to 10 ppb or less under some treatment conditions, even if it has a pore volume of 0.45 ml/g or more. In contrast, a fibrous activated carbon having a specific surface area of 3000 m²/g or more may be difficult to produce and is not practical. Likewise, a fibrous activated carbon having a pore volume of 1.5 ml/g or more may be difficult to produce and is not practical.

The reasons why the fibrous activated carbon is capable of removing trace amounts of metal components much more satisfactorily than conventional granular activated carbon have not yet been clarified, but one of them may be that the fibrous activated carbon can more efficiently utilize surfaces contributing to adsorption than the granular activated carbon. In comparison between a fibrous activated carbon and a granular activated carbon having equivalent specific surface area or pore volume, the granular activated carbon has a smaller aspect ratio, and its numerous pores reside deeper from the surface of the activated carbon. It is therefore difficult for an aqueous alkaline solution, specifically for an aqueous alkaline solution having a high concentration and a high viscosity, to penetrate deep into the pores. Thus, only inside surfaces of pores residing near to the surface of the granular activated carbon are used for adsorption. In contrast, the fibrous activated carbon has a larger aspect ratio, and its numerous pores reside shallower from the surface of the activated carbon. Assuming that the depth of pores of the fibrous activated carbon which the aqueous alkaline solution can penetrate is equivalent to that of the granular activated carbon, the fibrous activated carbon has an area of inner surfaces of pores that can be used for adsorption larger than that of the granular activated carbon, which probably contributes to increased capability of remove trace amounts of metal components.

The contents of iron, nickel, and copper inherently contained as metallic impurities in the fibrous activated carbon are each preferably 10 ppm or less. Large amounts of such metallic impurities may be dissolved in and contaminate the aqueous alkaline solution upon contact therewith.

According to the present invention, the adsorptivity of the fibrous activated carbon can be activated or increased by subjecting the fibrous activated carbon to a pretreatment with an acid. This procedure is referred to as "activation." The activation of the fibrous activated carbon can be carried out by bringing the fibrous activated carbon into contact with an acid or a mixture of two or more acids selected from the group consisting of hydrochloric acid, nitric acid, sulfuric acid, and phosphoric acid (hereinafter these substances are referred to as "activator(s)").

The acid concentration of the activator is 0.1 to 13 N, preferably 0.5 to 6.5 N, and more preferably 0.8 to 3 N. The contents of metallic impurities in the activator is preferably as small as possible.

In the present invention, the activation can be carried out before and/or after subjecting the fibrous activated carbon to purification of an aqueous alkaline solution. The reactivated fibrous activated carbon can be repeatedly used in purification.

The fibrous activated carbon can be brought into contact with the activator according to any procedure appropriately selected. For example, contact may be carried out by dipping the fibrous activated carbon in a tank filled with a solution of the activator. It is more preferred that the fibrous activated carbon is charged into a packed tower such as a column and that the activator is allowed to pass through the packed tower thereby to make contact between the fibrous activated carbon and the solution of the activator. The temperature upon contact is not specifically limited, as long as it is a temperature or below at which the activator decomposes or boils, but it is preferably 100° C. or below, and more preferably 20° C. to 80° C. The feed rate of the activator when passing through the packed tower can be set according to necessity but is preferably 0.2 $Hr^{-1}$ or more, and more preferably 0.5 to 10 $Hr^{-1}$ in terms of space velocity. If the space velocity is less than 0.2 $Hr^{-1}$, it may take a much long time to carry out the treatment (activation). If it exceeds 10 $Hr^{-1}$, sufficient activation may not be achieved. The amount of the activator to be supplied may be 2 times or more, and more preferably 3 times or more the volume of the vessel such as a column. When contact is carried out in a batch system, a single treatment time is preferably 30 minutes or more. The fibrous activated carbon after the activation is preferably washed with pure water thereby to remove the activator.

The water content comprised in the fibrous activated carbon (% by weight) can be determined by the ratio of the weight reduction obtained after drying the fibrous activated carbon bearing water at 60° C. for 2 hours. That is, the water content can be determined by following equation.

100×((the weight of the fibrous activated carbon bearing water before drying)−(the weight of the fibrous activated carbon after drying the fibrous activated carbon bearing water at 60° C. for 2 hours))/(the weight of the fibrous activated carbon bearing water before drying)

The fibrous activated carbon is preferably subjected to dewatering or drying before the purification of the aqueous alkaline solution, so that the water content in the fibrous activated carbon is 70% by weight or less, preferably 60% by weight or less. If the fibrous activated carbon is handled in a dried state, it often forms fine powder. Accordingly, to prepare a vessel such as a column charged with a dried fibrous activated carbon, it is preferred that the fibrous activated carbon is charged into the column while containing 30% by weight or more of water and is then dried.

An aqueous alkaline solution to be purified according to the present invention can be any one, unless adverse effects occur. The concentration of the metal hydroxide or metal hydroxides in the aqueous alkaline solution before purification is generally 10 to 55% by weight, preferably 20 to 52% by weight, and more preferably 30 to 52% by weight. When a pre-purified aqueous alkaline solution has a metal hydroxide concentration within the above-specified range, metal components are effectively removed from the aqueous alkaline solution using a fibrous activated carbon. The post-purified aqueous alkaline solution is suitable as an etching agent for silicon wafers. The present invention can treat any aqueous alkaline solution having any viscosity, as long as there is no problem. However, the viscosity of the aqueous alkaline solution to be treated may be generally about 1 to 70 mPa·s, preferably about 1.5 to 70 mPa·s, and more preferably about 1.9 to 60 mPa·s. The viscosity herein is determined at a temperature of the aqueous alkaline solution of 30° C. using a rotational viscometer.

In the present invention, metal components other than alkali metals and alkaline earth metals can be more efficiently removed, for example, by charging the fibrous activated carbon into a column, and allowing the aqueous alkaline solution to continuously pass through the column thereby to make contact between the fibrous activated carbon and the aqueous alkaline solution. Specifically, the aqueous alkaline solution is continuously fed into the column from an inlet such as a feed tube, is brought into contact with the fibrous activated carbon for purification, and the resulting treated solution is continuously discharged from an outlet such as an exhaust tube.

The present invention may employ contact between the fibrous activated carbon and the aqueous alkaline solution in a batch system. In the batch system, however, the aqueous alkaline solution is diluted with water contained in the fibrous activated carbon. Accordingly, the batch system requires a pretreatment such as concentrating the aqueous alkaline solution, increasing the concentration of the alkali metal hydroxide by adding a solid alkali metal hydroxide to the solution, or sufficiently drying the fibrous activated carbon. Such a pretreatment may decrease the efficiency in purification, and this must be taken into account.

The temperature upon contact between the aqueous alkaline solution and the fibrous activated carbon is not specifically limited, but is preferably 40° C. to 100° C., and more preferably 50° C. to 80° C. If the contact temperature is excessively low, the aqueous alkaline solution may have an excessively high viscosity, to deteriorate the contact efficiency and to reduce the removal rate of metallic impurities. In contrast, if the contact temperature is excessively high, constitutional materials typically of tanks become susceptible to corrosion, which may cause contamination of the aqueous alkaline solution.

The ratio of the amount of the aqueous alkaline solution to be treated to that of the fibrous activated carbon can be appropriately set in each treatment depending typically on the content of impurities in the aqueous alkaline solution, the type of the fibrous activated carbon and the like. The amounts of the aqueous alkaline solution and the fibrous activated carbon can be, for example, about 50 to 300 L and about 1 to 2 Kg, respectively, in general use. For example, to treat 100 L of the aqueous alkaline solution, the amount of the fibrous activated carbon is about 0.5 to 2 Kg. This range, however, is merely illustrated as an example, and the amount of the fibrous activated carbon can be set in each process according to conditions.

In the present invention, the aqueous alkaline solution can be fed to the fibrous activated carbon according to any procedure. It may for example be fed to the fibrous activated carbon by a pressure pump or be aspirated by a suction pump.

The vessel containing the fibrous activated carbon, such as a column, for use in the present invention preferably has one or more vacant layers free from the fibrous activated carbon arranged upstream from, downstream from and/or inside the fibrous activated carbon layer, as illustrated in FIG. 1. The presence of one or more vacant layers in the vessel markedly increase the amount of the aqueous alkaline solution to be treated and avoids uneven flow of the aqueous alkaline solution in the fibrous activated carbon layer thereby to make use of the fibrous activated carbon more effectively. In addition, having one or more vacant layers makes the connection of columns arbitrary. The total volume of one or more vacant layers is preferably 10% or less of the total volume of the column. If the volume exceeds 10% of the total volume of the column, the column may have an excessively large volume in total. The fibrous activated carbon for use in the present invention may constitute plural fibrous activated carbon layers divided by vacant layers or other layers. At least one of such fibrous activated carbon layers may have, for example, a mesh on its surface.

Figure 2:
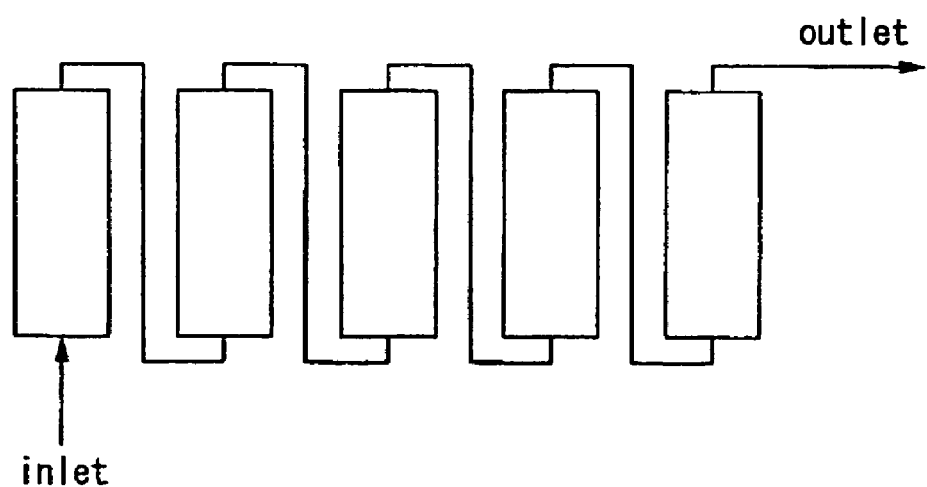
FIG. 2 is a schematic plan view of a device comprising a plurality of columns connected in series at some intervals for use in another aspect of the purification method of the present invention.
Figure 3:
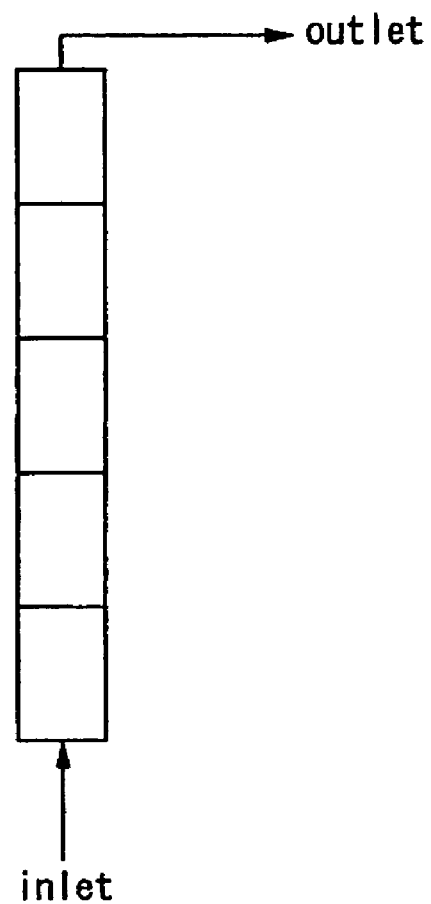
FIG. 3 is a schematic plan view of a device comprising a plurality of columns continuously connected in series for use in yet another aspect of the purification method of the present invention.

In the present invention, it is preferable to connect two or more columns to one another. The columns can be connected in any manner such as in series or in parallel. When they are connected in series, they may be connected directly as illustrated in FIG. 3 or indirectly at some intervals as illustrated in FIG. 2.

The vessel for use in the present invention is not limited to such columns and any vessel can be used herein, as long as it contains the fibrous activated carbon. The number and size of the vessel can be selected according to necessity. The inlet and outlet for the aqueous alkaline solution in the vessel may be the same as or different from each other, and their shapes, numbers, positions, and other parameters can be set according to necessity.

The fibrous activated carbon after purification with decreased capability of removing metallic impurities can be regenerated (reactivated) by treating with the activator.

The regeneration (reactivation) of the used fibrous activated carbon can be carried out, for example, by the following method. Initially, the fibrous activated carbon charged in a column is washed with pure water until water discharged form the outlet of column has an alkaline concentration of 1% by weight or less. The fibrous activated carbon is then brought into contact with an activator which is an acid or a mixture of two or more acids selected from the group consisting of hydrochloric acid, nitric acid, sulfuric acid, and phosphoric acid by allowing the activator to pass through the column continuously, or to pass through the column in a predetermined amount and ceasing the flow of the activator for a predetermined time to contact the activator and the fibrous activated carbon. The pure water for removing alkaline components is preferably warm water at 40° C. or higher, preferably 70° C. to 90° C. Pure water at an excessively low temperature may not efficiently remove metallic impurities and alkaline components attached to the fibrous activated carbon. The temperature upon contact between the activator and the fibrous activated carbon is not specifically limited, as long as it is a temperature or below at which the activator does not decompose or boil, but it is preferably 100° C. or below, and more preferably 20° C. to 80° C. The feed rate of the activator is preferably 0.2 $Hr^{-1}$ or more, and more preferably 0.5 to 10 $Hr^{-1}$ in terms of space velocity. If the feed rate is less than 0.2 $Hr^{-1}$, it may take a much long time to carry out the treatment for reactivation. If it exceeds 10 $Hr^{-1}$, sufficient reactivation may not be achieved. The amount of the activator to be supplied is preferably 2 times or more, and more preferably 3 times or more the volume of the vessel such as a column. The fibrous activated carbon after reactivation is preferably further washed with pure water thereby to remove the activator.

The aqueous alkaline solution obtained by the method of the present invention, in which metal components other than alkali metals and alkaline earth metals are reduced to specific amounts or less, is highly removed in metal components such as nickel, iron, molybdenum and/or copper. The resulting aqueous alkaline solution can be suitably used as an etching agent for silicon wafers.

EXAMPLES

The present invention will now be illustrated in detail by way of examples, which by no means limit the scope of the present invention.

Examples 1 to 9 and Comparative Examples 1 to 3

Each of fibrous activated carbons listed in Table 2 was charged into 17-ml columns (FIG. 4), seven pieces of the charged columns were continuously placed in series into a quartz glass tube with a jacket (FIG. 5), and warm water at 63° C. was circulated in the jacket. Nitrogen gas was allowed to pass through the columns at an inlet-side pressure of 0.11 MPa for 2 hours thereby to dry the fibrous activated carbon before allowing a aqueous sodium hydroxide solution to pass through the columns. An aqueous 48.3 wt % sodium hydroxide solution containing 50 ppb of nickel, 1100 ppb of iron, and 20 ppb of molybdenum was fed into the columns from a lower inlet of the quartz glass tube at a feed rate of 300 ml/hr. Fractions from 200 ml to 400 ml of the aqueous sodium hydroxide solution passed through the columns were collected from an upper outlet of the quartz glass tube, and metallic impurities were quantitatively assayed by inductively couples plasma-mass spectrometry (ICP-MS). The specific surface areas and pore volumes of the activated carbons listed in Table 2 are values determined from the nitrogen absorption measured by manufacturers according to the BET method. In Example 6, a fibrous activated carbon FR-20 was used after immersing in 1.5 N hydrochloric acid for one hour, washing with water, and dewatering by centrifugation. In Example 7, a fibrous activated carbon FR-20 was used after immersing in 1 N nitric acid for one hour, washing with water, and dewatering by centrifugation. In Example 8, the procedure of Example 2 was carried out, except for allowing an aqueous 48 wt % potassium hydroxide solution containing 500 ppb of iron and 60 ppb of nickel to pass through the column.

In Comparative Examples 1 to 3, the procedure of Examples 1 to 8 was carried out, except for using a vessel prepared by charging 8 g of a granular activated carbon instead of the fibrous activated carbon into a column, and continuously placing seven pieces of the charged columns in series into a quartz glass tube. In Comparative Examples 1 and 2, the same aqueous sodium hydroxide solution as Example 1 was allowed to pass through the columns. In Comparative Example 3, the same aqueous potassium hydroxide solution as Example 8 was allowed to pass through the columns.

In Example 9, an aqueous alkaline solution to be analyzed was purified by placing and mixing 100 ml of the same aqueous sodium hydroxide solution as Example 1 and 2 g (dry weight) of a fibrous activated carbon FR-20 in a vessel made of a fluororesin, bringing them in contact with each other at 60° C. for one hour, and separating the aqueous alkaline solution by filtration. Metallic impurities in the separated aqueous alkaline solution was similarly quantitatively assayed.

In Example 10, an aqueous sodium hydroxide solution containing 350 ppb of copper was prepared by a method wherein a piece of metal copper was immersed, for eight hours, in an aqueous sodium hydroxide solution which was the same aqueous sodium hydroxide solution as Example 1 and heated at 80° C. The aqueous sodium hydroxide solution containing 350 ppb of copper was purified by placing 100 ml of the aqueous sodium hydroxide solution and 2 g (dry weight) of a fibrous activated carbon FR-20 in a vessel made of a fluororesin, mixing them, bringing them in contact with each other at 60° C. for one hour, and separating the aqueous alkaline solution by filtration. Metallic impurities in the separated aqueous alkaline solution was similarly quantitatively assayed.

Table 1 demonstrates that the fibrous activated carbons according to the present invention are capable of removing nickel and iron contained in the aqueous sodium hydroxide solutions much more highly than the granular activated carbon having equivalent specific surface area and pore volume. It also demonstrates that the fibrous activated carbon having a specific surface area of 1500 m$^2$/g or more and a pore volume of 0.45 ml/g or more has a further high capability of removing nickel; and that the fibrous activated carbon activated by contact with an activator has a markedly improved capability of removing nickel.

The comparison between Example 1 and Example 9 shows that bringing the fibrous activated carbon into contact with the aqueous alkaline solution in a continuous system enables higher purification than bringing them into contact in a batch system. The comparison between another Example and Comparative Example demonstrates that the method of the present invention enables removal of nickel and iron from an aqueous potassium hydroxide solution as from an aqueous sodium hydroxide solution. The result of Example 10 shows that the fibrous activated carbon used in the present invention has a capability to remove copper.

TABLE 1

| | Activated carbon | Activator | Amount of activated carbon (per column) (g) | Nickel content | Iron content | Molybdenum content | Copper content |
|---|---|---|---|---|---|---|---|
| Example 1 | FR-25 | none | 2 | 0.11 | 3.8 | | |
| Example 2 | FR-20 | none | 2 | 0.14 | 4.0 | 2 | |
| Example 3 | FR-15 | none | 2 | 0.22 | 6.8 | | |
| Example 4 | A-15 | none | 2 | 0.90 | 230 | | |
| Example 5 | A-10 | none | 2 | 4.20 | 600 | | |
| Example 6 | FR-20 | hydrochloric acid | 2 | 0.1 or less | 5.0 | | |
| Example 7 | FR-20 | nitric acid | 2 | 0.1 or less | 5.0 | | |
| Example 8 | FR-20 | none | 2 | 0.16 | 10 | | |
| Example 9 | FR-20 | none | 2 | 2.3 | 150 | | |
| Example 10 | FR-20 | none | 2 | | | | 130 |
| Comparative Example 1 | GLC | none | 8 | 38 | 1000 | 20 | |
| Comparative Example 2 | WH2C | none | 8 | 45 | 800 | | |
| Comparative Example 3 | GLC | none | 8 | 55 | 450 | | |

Examples 1 to 10: The water content of the fibrous activated carbon was adjusted to 50% by weight before charging. The values listed in the table are dry weights.

Comparative Examples 1 to 3: The product as intact was charged into columns.

Fibrous activated carbon FR (material: phenol resin): a product of KURARAY CHEMICAL CO., LTD.

Average fiber diameter: 10 μm

Fibrous activated carbon A (material: petroleum pitch): a product of UNITIKA, LTD.

Granular activated carbon GLC (material: coconut shell): a product of KURARAY CHEMICAL CO., LTD.

Granular activated carbon WH2C (material: coconut shell): a product of Takeda Pharmaceutical Co., Ltd.

In the above table, blanks represent that measurements were not conducted.

TABLE 2

| Activated carbon | Manufacturer | Specific surface area ($m^2/g$) | Pore volume (ml/g) | Average aspect ratio | Aspect ratio (distribution) |
|---|---|---|---|---|---|
| FR-25 | KURARAY CHEMICAL | 2500 | 1.2 | 525 | 120-1040 |
| FR-20 | KURARAY CHEMICAL | 2000 | 0.75 | 400 | 50-1500 |
| FR-15 | KURARAY CHEMICAL | 1500 | 0.50 | | |
| A-15 | UNITIKA | 1500 | 0.80 | 420 | 200-860 |
| A-10 | UNITIKA | 1000 | 0.50 | | |
| GLC | KURARAY CHEMICAL | 1400-1600 | 0.80-1.1 | | |

The specific surface areas and pore volumes listed herein are measured values or values listed in catalogues of manufacturers.

Examples 11 and 12

A fibrous activated carbon FR-20 was activated by bringing into contact with 1.5 N hydrochloric acid by the procedure of Example 6. The treated fibrous activated carbon (2 g, dry weight) was charged into 18 ml columns having the same structure as in FIG. 1, except for having a 1 ml vacant layer adjacent to an inlet for aqueous sodium hydroxide solution. Six pieces of the columns containing the fibrous activated carbon were continuously placed in series in a quartz glass tube with a jacket as in Examples 1 to 8, and warm water at 63° C. was circulated in the jacket. Nitrogen gas was allowed to pass through the columns from the top of the quartz glass tube at an inlet-side pressure of 0.11 MPa for 2 hours, thereby to dry the fibrous activated carbon. Next, 1000 ml of an aqueous 48.3 wt % sodium hydroxide solution containing 50 ppb of nickel and 1100 ppb of iron was allowed to pass through the columns from the bottom of the quartz glass tube at a feed rate of 300 ml/hr. Every 100 ml of the resulting aqueous sodium hydroxide solution was collected, and the nickel and iron contents were analyzed by ICP-MS. In Example 12, columns were prepared by charging fibrous activated carbon FR-20, and an aqueous sodium hydroxide solution was purified and was analyzed by the procedure of Example 11, except for using columns having no vacant layer.

Table 3 shows that using columns having a vacant layer and containing the fibrous activated carbon enables continuous production of an aqueous sodium hydroxide solution having a nickel content of 0.1 ppb or less.

TABLE 3

| Metal impurities | | Analysis data (ppb) | | | | |
|---|---|---|---|---|---|---|
| | | 100-200 | 300-400 | 500-600 | 700-800 | 900-1000 |
| Example 11 | Ni | 0.1 or less | 0.1 or less | 0.1 or less | 0.1 or less | 0.1 or less |
| | Fe | 6.4 | 4.6 | 10 | 8.2 | 10 |
| Example 12 | Ni | 0.1 or less | 0.1 or less | 0.1 or less | 0.11 | 0.13 |
| | Fe | 4.0 | 2.4 | 2.4 | 23 | 46 |

Examples 13 and 14

Figure 4:
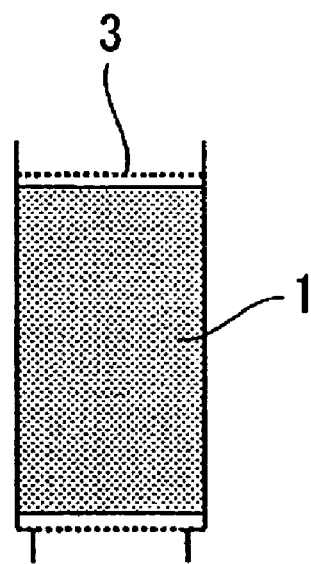
FIG. 4 is a schematic cross-sectional view illustrating a column containing a fibrous activated carbon and having a mesh filter.
Figure 5:
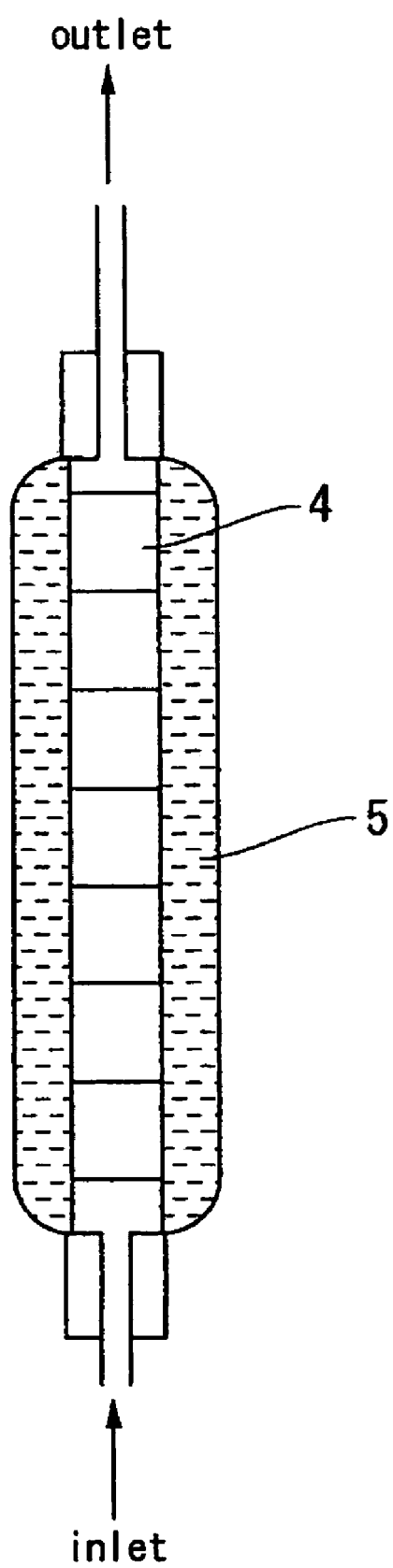
FIG. 5 is a schematic cross-sectional view of a device for use in an embodiment of the purification method of the present invention, in which purification is carried out by using a plurality of columns arranged in series in a quartz glass tube with a jacket while circulating warm water in the jacket.

A fibrous activated carbon FR-20 was activated by immersing in 1.5 N hydrochloric acid, whose water content was then adjusted to 50% by weight by the procedure of Example 6. The treated fibrous activated carbon was charged into columns having a capacity of 17 ml as illustrated in FIG. 4. Seven pieces of the charged columns were continuously placed in series in a quartz glass tube with a jacket (FIG. 5), and warm water at 63° C. was circulated in the jacket. Nitrogen gas was allowed to pass through the columns at an inlet-side pressure of 0.11 MPa for 2 hours thereby to dry the fibrous activated carbon before allowing a sample aqueous sodium hydroxide solution to pass through the columns. An aqueous 48.3 wt % sodium hydroxide solution (800 ml) containing 50 ppb of nickel and 1100 ppb of iron was then allowed to pass through the columns from the bottom of the quartz glass tube at a feed rate (passing rate) of 300 ml/hr, to give a used fibrous activated carbon.

Subsequently, the aqueous alkaline solution contained in the used fibrous activated carbon FR-20 charged in the seven columns was extracted while the fibrous activated carbon was placed as intact in the quartz glass tube. Next, the temperature of the circulating warm water in the jacket of the quartz glass tube was elevated to 80° C., and 1000 ml of pure water was passed through the columns from the bottom of the quartz glass tube at a feed rate of 300 ml/hr. Next, 500 ml of 1.5 N hydrochloric acid at a feed rate of 300 ml/hr and 500 ml of pure water at a feed rate of 300 ml/hr were subsequently allowed to pass through the columns. Thus, the fibrous activated carbon in the columns was reactivated. Again, nitrogen gas was allowed to pass through the columns at an inlet-side pressure of 0.11 MPa for 2 hours thereby to dry the fibrous activated carbon before allowing another aqueous sodium hydroxide solution to pass through the columns. The temperature of the circulating water in the jacket of the quartz glass tube was controlled to 63° C., and 800 ml of an aqueous sodium hydroxide solution to be treated containing 50 ppb of nickel and 1100 ppb of iron was purified by passing through the columns at a feed rate of 300 ml/hr. The nickel and iron contents of the purified aqueous sodium hydroxide solution were analyzed by ICP-MS by collecting fractions from 200 ml to 400 ml of discharged aqueous solution.

In Example 14, a used fibrous activated carbon was obtained and the used fibrous activated carbon FR-20 was regenerated by the procedure of Example 13, except that 1.5 N hydrochloric acid as an activator was not passed through the columns. Namely, the aqueous sodium hydroxide solution to be treated was purified by passing through columns, the discharged liquid was collected and analyzed by the procedure of Example 13.

Table 4 shows analysis data of Examples 13 and 14. Table 4 demonstrates that the fibrous activated carbon exhibits markedly recovered capability of removing metallic impurities by bringing into contact with an activator, and that the removal capability is not sufficiently recovered without activation with the activator.

TABLE 4

|  | Activated carbon | Activator used in reactivation | Amount of activated carbon (per column) (g) | Analysis data | |
|---|---|---|---|---|---|
|  |  |  |  | Nickel content (ppb) | Iron content (ppb) |
| Example 13 | FR-20 | 1.5 N hydrochloric acid | 2 | 0.1 or less | 4.8 |
| Example 14 | FR-20 | none | 2 | 2.8 | 352 |

Example 15 and Comparative Example 4

In an etching tank having an internal capacity of 1000 ml was placed 600 ml of an aqueous 48.3 wt % sodium hydroxide solution purified under the conditions of Example 6 and having a nickel content of 0.1 ppb or less, and the solution was heated to 80° C. A lapped wafer having a p-type resistivity of 0.01 to 0.02 Ω·cm and having a diameter of 200 mm was immersed in the etching agent in the etching tank for 6 minutes. Such a wafer is most susceptible to contamination with nickel. Thus, the level of contamination of the wafer with nickel was analyzed.

The level of contamination with nickel was determined in the following manner. Initially, the surface of the etched wafer was washed with pure water for 5 minutes, was further washed with 0.1 N hydrofluoric acid for one minute, and the wafer was fully dissolved by the action of vapors of hydrofluoric acid and nitric acid, and the residue was analyzed by ICP-MS. In Comparative Example 4, etching was carried out and the level of contamination with nickel was determined by the procedure of Example 15, except for using, for etching, an aqueous 48.3 wt % sodium hydroxide solution having a nickel content of 50 ppb without purification by the fibrous activated carbon.

Table 5 demonstrates that the etched wafer is significantly reduced in the nickel content when an aqueous sodium hydroxide solution having a nickel content of 0.1 ppb or less is used for etching.

TABLE 5

|  | Nickel content in aqueous sodium hydroxide solution (ppb) | Nickel content in wafer ($\times 10^{10}$ atoms/cm$^2$) |
|---|---|---|
| Example 15 | 0.1 or less | 0.2 |
| Comparative Example 4 | 50 | 8.1 |

INDUSTRIAL APPLICABILITY

The method and device for purifying an aqueous alkaline solution according to the present invention enable production of high-purity aqueous alkaline solutions containing markedly reduced amounts of metallic impurities. The resulting aqueous alkaline solutions can be suitably used as an etching agent for silicon wafers for use typically in semiconductor substrates and the like.

By using a fibrous activated carbon, the present invention provides a method for industrially producing high-purity aqueous alkaline solutions, whose metal components such as iron, nickel, molybdenum and copper are reduced to such levels as to be suitably used as an etching agent for silicon wafers.

The invention claimed is:

1. A method for purifying an aqueous alkaline solution, comprising:
   bringing a fibrous activated carbon into contact with an aqueous alkaline solution to remove a metal component other than alkali metals and alkaline earth metals from the aqueous alkaline solution,
   wherein the aqueous alkaline solution is an aqueous alkaline solution which comprises at least one hydroxide of at least one metal selected from the group consisting of alkali metals and alkaline earth metals, and further comprises the at least one metal component other than alkali metals and alkaline earth metals,
   wherein the aqueous alkaline solution is an aqueous sodium hydroxide solution or an aqueous potassium hydroxide solution,
   wherein the metal component other than alkali metals and alkaline earth metals contained in the aqueous alkaline solution contains at least one metal selected from the group consisting of iron, nickel, molybdenum and copper,
   wherein a concentration of metal hydroxide comprised in the aqueous alkaline solution is 10 to 55% by weight, and wherein the fibrous activated carbon has an average aspect ratio of 50 or more, a specific surface area of 2000 m$^2$/g or more and a pore volume of 0.75 ml/g or more, and
   wherein the metal component other than alkali metals and alkaline earth metals contained in the aqueous alkaline solution are reduced to 200 ppb or less.

2. The method for purifying an aqueous alkaline solution according to claim 1, further comprising: activating a fibrous activated carbon with an acid or a mixture of two or more acids selected from the group consisting of hydrochloric acid, sulfuric acid, nitric acid, and phosphoric acid before bringing the fibrous activated carbon into contact with the aqueous alkaline solution.

3. The method for purifying an aqueous alkaline solution according to claim 1, further comprising:
   continuously passing the aqueous alkaline solution through a column containing the fibrous activated carbon thereby to bring the fibrous activated carbon into contact with the aqueous alkaline solution.

4. The method for purifying an aqueous alkaline solution according to claim 3, wherein the column containing the fibrous activated carbon includes at least one fibrous activated carbon layer and at least one vacant layer free from the fibrous activated carbon, and wherein the at least one vacant layer is arranged upstream from, downstream from, and/or inside the at least one fibrous activated carbon layer.

5. The method for purifying an aqueous alkaline solution according to claim 3, wherein two or more columns which contain the fibrous activated carbon and are connected to each other are used.

6. The method for purifying an aqueous alkaline solution according to claim 1, further comprising:
   washing the fibrous activated carbon, which is a spent fibrous activated carbon used for a purification of the aqueous alkaline solution, with pure water;
   bringing the washed fibrous activated carbon into contact with an acid or a mixture of two or more acids selected from the group consisting of hydrochloric acid, nitric acid, sulfuric acid, and phosphoric acid for activation to obtain a recycled fibrous activated carbon; and using the fibrous activated carbon again for purification of an aqueous alkaline solution.

7. The method for purifying an aqueous alkaline solution according to claim 1, wherein the metal component other than alkali metals and alkaline earth metals contained in the aqueous alkaline solution is reduced to 10.16 ppb or less.

8. The method for purifying an aqueous alkaline solution according to claim 1, wherein the metal component other than alkali metals and alkaline earth metals contained in the aqueous alkaline solution, comprises nickel, and the nickel contained in the aqueous alkaline solution is reduced to 10 ppb or less.

* * * * *